US008830532B2

(12) United States Patent
Chang

(10) Patent No.: US 8,830,532 B2
(45) Date of Patent: Sep. 9, 2014

(54) PRINTING CONTROL METHOD AND PRINTING SYSTEM SENDING COLOR COMPONENTS TO THE PRINTER EXCEPT FOR COLOR COMPONENTS THAT CONTAIN ZEROS FOR ALL CONTENT

(71) Applicant: Aetas Technology Incorporated, Arcadia, CA (US)

(72) Inventor: Chun-Yu Chang, Hsinchu County (TW)

(73) Assignee: Aetas Technology Incorporated, Arcadia ( * ) Notice: Subject to any disclaimer, the term of this patent is extended or adjusted under 35 U.S.C. 154(b) by 63 days.

(21) Appl. No.: 13/735,014

(22) Filed: Jan. 6, 2013

(65) Prior Publication Data
US 2013/0286414 A1    Oct. 31, 2013

(30) Foreign Application Priority Data

Apr. 28, 2012    (CN) .......................... 2012 1 0134445

(51) Int. Cl.
*H04N 1/50* (2006.01)
*H04N 1/60* (2006.01)
*H04N 1/64* (2006.01)

(52) U.S. Cl.
CPC ................. *H04N 1/50* (2013.01); *H04N 1/648* (2013.01); *H04N 1/506* (2013.01)
USPC ........... 358/3.24; 358/501; 358/518; 358/539

(58) Field of Classification Search
None
See application file for complete search history.

(56) References Cited

U.S. PATENT DOCUMENTS 7,646,502 B2 *    1/2010    Suzuki .......................... 358/1.15
8,542,369 B2 *    9/2013    Hyogo et al. .................. 358/1.1

* cited by examiner

*Primary Examiner* — Scott A Rogers

(57) ABSTRACT

A printing control method of a printer is implemented in a printing system including an information providing device and a printer. The printer is connected to the information providing device for printing data sent by the information providing device. Once a printing driver program of the information providing device receives page data to be outputted, the printing driver program converts a number of first color components of the page data into a number of second color components and checks if any one of the second color components contains zeroes for all the content. If one second color component is found to have zeroes for all the content, this very second color component will not be sent to the printer, whereas the rest of the second color components will be sent to the printer for output.

10 Claims, 3 Drawing Sheets

PRINTING CONTROL METHOD AND PRINTING SYSTEM SENDING COLOR COMPONENTS TO THE PRINTER EXCEPT FOR COLOR COMPONENTS THAT CONTAIN ZEROS FOR ALL CONTENT

BACKGROUND OF THE INVENTION

1. Field of the Invention

The invention relates to a printing control method, and more particularly, to a printing control method capable of increasing the rate of printing through skipping color data having no content and a printing system using the same.

2. Description of the Prior Art

Electrophotography printing devices output an image through a way called ElectroPhotoGraphy (EPG). Such technology includes a number of steps: charging, exposure, developing, transfer, and fusing. When such printing devices are printing an image, a charger of the device first charges a photoconductor with negative charges, which is called the charging process. Then the printing device performs the exposure process by converting the data to be outputted into a form of photo instructions through a light emitting diode (LED) or Laser and the photo instructions will be projected on the photoconductor full of negative charges on the surface. Voltage differences exist between the areas of the photoconductor projected with lights and without lights. The area projected with lights, the exposed area, has higher voltage level than the area not being projected with lights, the unexposed area. A latent image, which is a voltage image expressed with voltage difference, may by formed on the photoconductor through the above process.

Once the latent image is formed on the photoconductor, developing will be the next process. Powdered carbons that have same voltage level as the unexposed area are unable to be attached to the unexposed area due to static propelling force but will be attached to the exposed area that has higher voltage level due to static attraction force. When the exposed area are attached with powdered carbons, and this is called the developing, the attached powdered carbons will be transferred to the paper or any medium, which is called the transfer process. For a multi-pass transfer process, four pass for example, a single charger is commonly used to perform the charging process and it will take the photoconductor to rotate for four rounds when using such charger to process a color page output.

Finally, a hot roller and a pressure roller are used to fix the powdered carbons firmly on the paper or any available medium, which is so called the fusing process.

As described, for an electrophotography printing device to go through four pass transfer and output a color page, the color data mainly includes four color components: cyan, magenta, yellow, and black. It requires the photoconductor to rotate for four rounds before all the four color components are completely transferred to the paper and a color page is finished. Statistically, however, not every page in every printing job contains content of all four color components. It is much more common that text content with simply black component involved is the case, especially for an office like environment. Two-tone printing is also quite usual and full color printing that uses all the four color components also exists, only in a comparably much fewer instances than the black and white printing or two-tone printing. For the black and white printing and two-tone printing, the printing driver program of a computer will routinely convert all the RGB data shown on the display into four color components: CMYK. These four CMYK color components together with their printing control codes will be all sent to the printer. In such way, the printer always goes through a printing job with four colors rounds, the photoconductor rotating four rounds, whatever the data for printing is. Printers using a conventional way like this have problems in promoting the transmission of data and the printing rate of the machine.

SUMMARY OF THE INVENTION

Given the problems that a printer with the conventional printing algorithm does not have a way to promote the printing program, the invention provides a printing control method that can be implemented to a laser printer or an LED printer and a printing system using such printing control method to solve the problems.

According to an embodiment of the invention, a printing control method for a printer is provided, wherein a printing system includes an information providing device (such as a computer, a mobile phone or a digital camera) and a printer, which is electrically connected to the information providing device and is adapted for printing data sent by the information providing device. The method includes following steps: a printing driver program of the information providing device receiving page data from an application program of the information providing device, the page data comprising a plurality of first color components belonging to a first color space; the printing driver program converting the plurality of first color components into a plurality of second color components belonging to a second color space; the printing driver program checking if any of the second color components contains zeroes for all the content; and the printing driver program sending the plurality of second color components, except for a third color component, to the printer for outputting the page data, wherein the third color component is one of the plurality of second color components that contains zeroes for all the content. The printer is a laser printer, an LED printer, or a multiple-imaging color ElectroPhotoGraphy (EPG) printer, and the printer sequentially prints the plurality of second color components using a photo conductor.

A printing system is also provided in the embodiment of the invention. The printing system includes an information providing device and a printer. The information providing device includes a printing driver program and an application program. The printing driver program is adapted for receiving page data from the application program. The page data includes a plurality of first color components belonging to a first color space. The printing driver program is adapted for converting the plurality of first color components into a plurality of second color components belonging to a second color space. The printer is electrically connected to the information providing device and is adapted for printing data sent by the information providing device. The printing driver program is adapted for sending the plurality of second color components, except for a third color component, to the printer for outputting the page data. The third color component is one of the plurality of second color components that contains zeroes for all the content The printing system and the printing control method of a printer provided in the embodiments of the invention also disclose that the printer is a laser printer or an LED printer. Such printer sequentially prints the plurality of second color components using a photo conductor. The printing driver program includes a compression program adapted for performing a compression process to each of the second color components respectively, and the printing driver program is also adapted for checking if any of the second color components contains zeroes for all the content during the compression process to each of the second color component.

The printing system and the printing control method of a printer provided in the embodiments of the invention also disclose that the printing driver program is adapted for sending the plurality of second color components, except for the third color component, and printing control code corresponding to each of the sent second color components to the printer The printer also includes a memory unit to store the plurality of second color components, except for the third color component, and printing control code corresponding to each of the sent second color components sent by the information providing device.

The printing system and the printing control method of a printer provided in the embodiments of the invention also disclose that the first color space is a color space defined by three primary colors: red (R), green (G), and blue (B), and the second color space is a color space defined by four primary colors of pigment: cyan (C), magenta (M), yellow (Y), and black (K).

The printing system and the printing control method of a printer provided in the embodiments of the invention also disclose that the printer is a multiple-imaging color ElectroPhotoGraphy (EPG) printer.

With the printing control method and the printing system implementing such printing control method, for a printer like a multiple-imaging color ElectroPhotoGraphy (EPG) printer to output page data in single color, two colors or so, those color components with no substantial content in it will not be sent to the printer, which notably increases the printing speed of the printer when dealing with output of non-full-colored data, and also reduces the use of the memory inside the printer.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. In the following discussion and in the claims, the terms "include" and "comprise" are used in an open-ended fashion. Also, the term "couple" or "connect" is intended to mean either an indirect or direct electrical connection. Thus, if a first device is coupled or connected to a second device, that connection may be through a direct electrical connection, or through an indirect electrical connection via other devices and connections.

Figure 1:
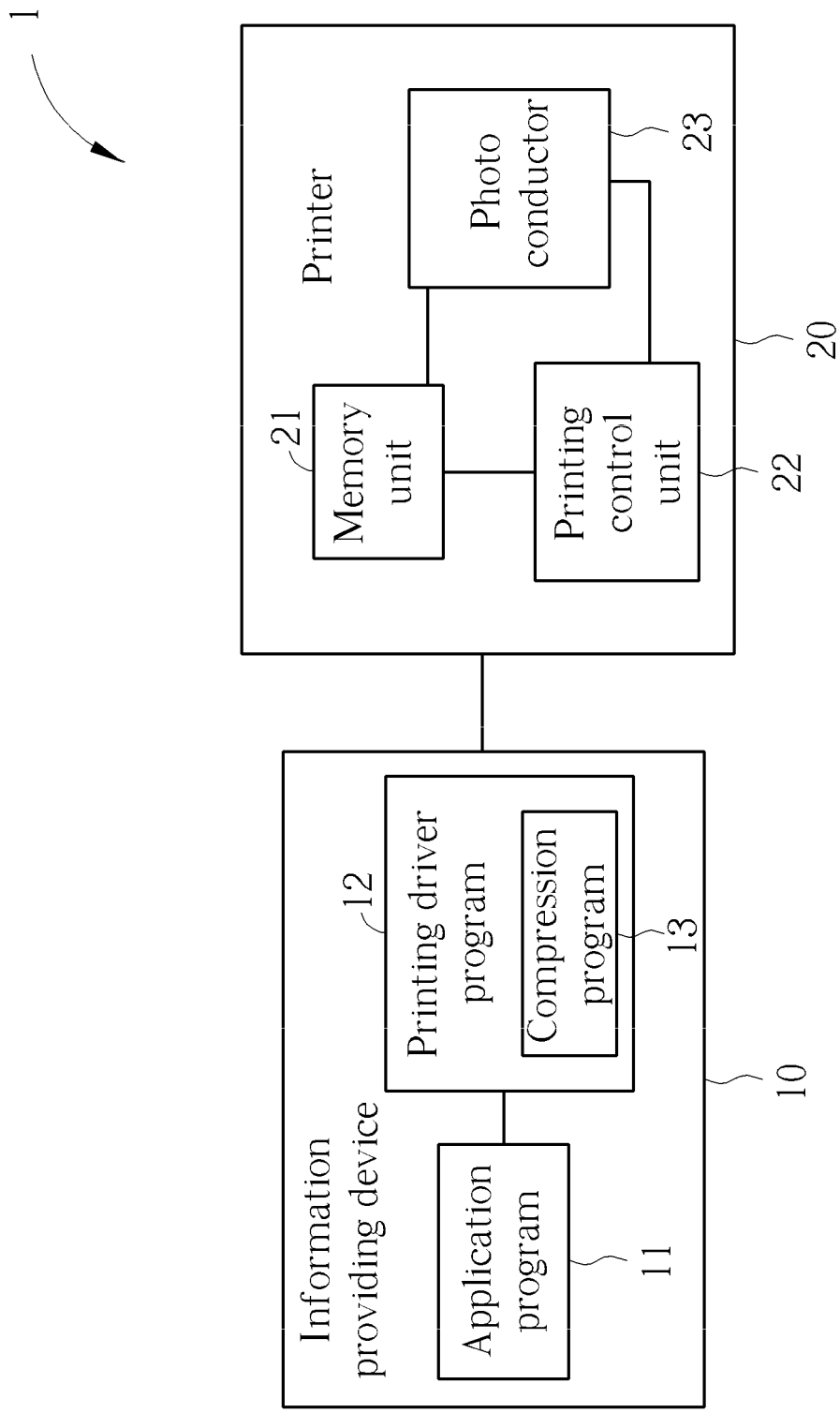
FIG. 1 is an illustration of a printing system according to the invention.

Please refer to FIG. 1, which is an illustration of a printing system according to the invention. The printing system 1 includes at least an information providing device 10 (such as a computer, a mobile phone or a digital camera) and at least a printer 20. Here the computer is chose as an exemplary representation of the information providing device 10, and the printer 20 may be connected to the information providing device 10 via either wired connection port or wireless connection, to print out the data sent by the information providing device 10. The printer 20 may be implemented as a laser printer, an LED printer, or a multiple-imaging color ElectroPhotoGraphy (EPG) printer. Given the working principle of the type of printers, the printer 20 may includes a memory unit 21, a printing control unit 22, and a photo conductor 23. The memory unit 21 stores, in a temporary sense, the data sent from the information providing device 10 and the printing control unit 22 controls the photo conductor 23 to print out the data. From the information providing device 10, the printer 20 receives data with four color components, which are cyan (C), magenta (M), yellow (Y), and black (K), and the photo conductor 23 is commanded to rotate for four rounds so that each of the color components may be transferred onto the paper to finish a color printing for one page.

The information providing device 10 includes a number of application programs 11 and a print driver program 12, which are generically included in the operation system (OS). The page data generated by any one of the application programs 11 will be sent to the printing driver program 12 and then sent to the printer 20 for printing.

Figure 2:
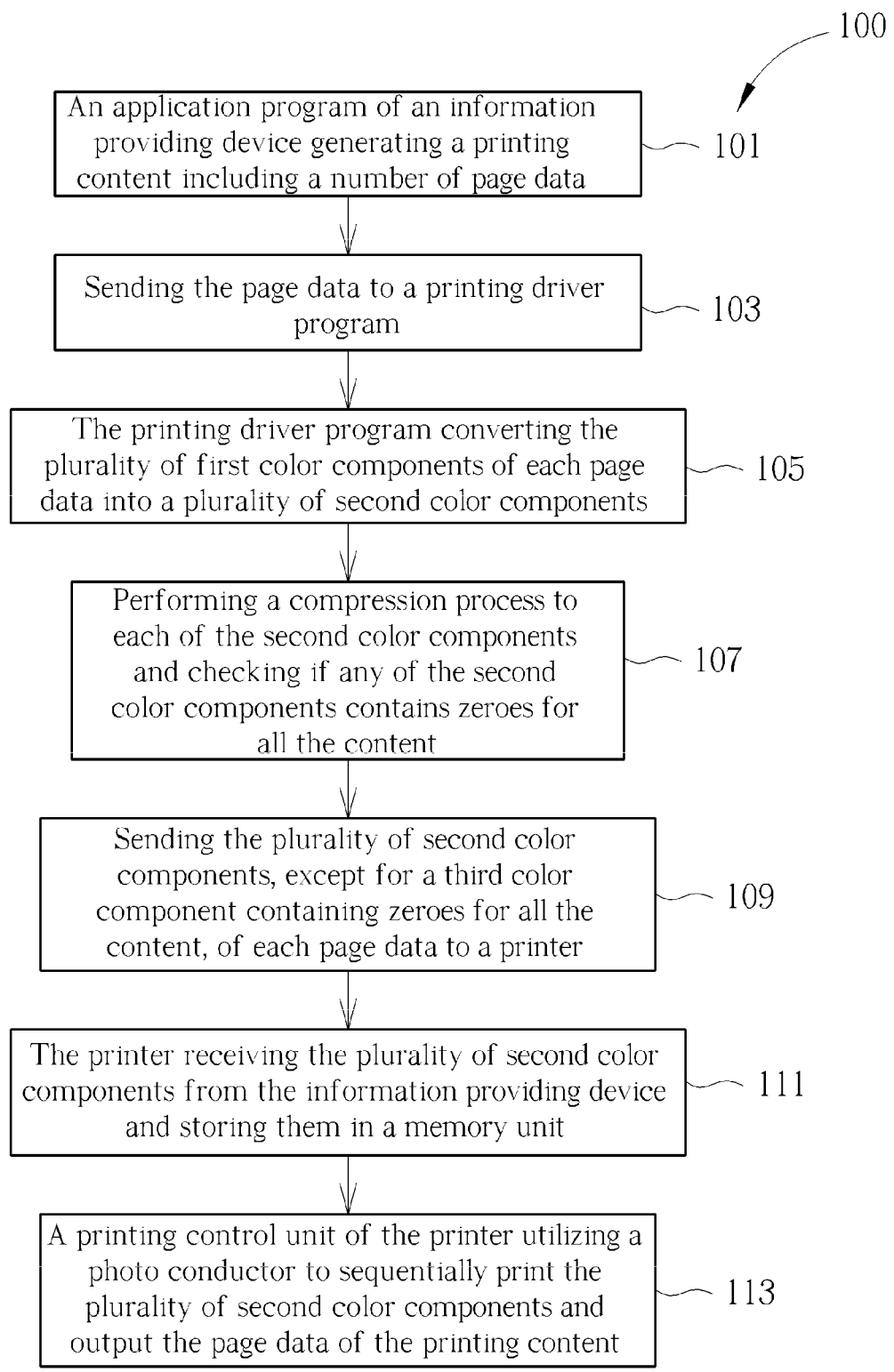
FIG. 2 is an illustration of a flow chart of a printing control method according to the invention.

Please refer to FIG. 2, which is an illustration of a flow chart of a printing control method according to the invention. The printing control method 100 includes the following steps:

Step 101: an application program of the information providing device generating a printing content including a number of page data, each page data including a plurality of color components;

Step 103: the application program sending the generated page data to the printing driver program;

Step 105: the printing driver program converting the plurality of first color components of each page data into a plurality of second color components;

Step 107: a compression program of the printing driver program performing a compression process to each of the second color components, the printing driver program checking if any of the second color components contains zeroes for all the content during the compression process to each of the second color component; one of the second color components is termed as a third color component that contains zeroes for all the content;

Step 109: the printing driver program sending the plurality of second color components, except for the third color component, of each page data to the printer;

Step 111: the printing control unit of the printer receiving the plurality of second color components from the information providing device and storing them in the memory unit;

Step 113: the printing control unit of the printer utilizing a photo conductor to sequentially print the plurality of second color components and output the page data of the printing content.

In the embodiments of the invention, Step 101 indicates that each page data contains a number of first color components, primary colors belonging to a first color space. Preferably, the first color space is an RGB color space defined by three primary colors: red (R), green (G), and blue (B), in order to show images with mixture of these colors on a display of the information providing device. Hence, the printing content generated by the application program 11 of the information providing device 10 in Step 101 includes page data that may contain three first color components: red, green, and blue. These three color components form the color page data.

Next in Step 103, the printing driver program 12 of the information providing device 10 receives the page data, each including three first color components, from the application program 11.

Following up in Step 105, the printing driver program 12 converts the three first color components of each page data into a number of second color components. Likewise, the second color components are primary colors belonging to a second color space. Since a printing job is about desktop publishing, which presents patterns mixed with various colors on a white paper or other type of materials, inks for such printing job includes four primary colors of pigment: cyan (C), magenta (M), yellow (Y), and black (K), which define the CMYK color space, or the second color space termed in the application. Accordingly, in Step 105, the three first color components (red, green, and blue) of each page data are converted into four color components (cyan, magenta, yellow, and black) and these four color components of the second color space are used to form a color printed page.

In Step 107, the printing driver program 12 uses a compression program 13 (FIG. 1) to perform a compression process to these second color components, during which the content of each second color component will be accessed and compressed by the compression program 13. The printing driver program 12 makes use of such process to check if any one of the second color components contains zeroes for all the content. If there is some second color component of some page data contains zeroes for all the content, it means the page data has no content for that second color component, which is now termed, for an exemplary purpose, as a third color component that has no meaningful content, or no 1's in a digital sense.

Once each second color component of each page data is compressed, Step 109 shows that the printing driver program 12 sends these second color components and printing control code corresponding to each of the second color components to the printer 20, but instead, one or more second color components termed as the third color components in Step 107 along with their printing control codes will not be sent to the printer 20. The second color components and corresponding printing control codes sent by the printing driver program 12 will be stored temporarily in the memory unit 21 of the printer 20 (Step 111). Finally, the printer 20 prints out/outputs each second color component of each page data stored in the memory unit 21 through the photo conductor 23, whereas those second color components termed as the third color components in Step 107 are skipped in the sending to the printer 20 stage and outputting/printing out stage.

Figure 3:
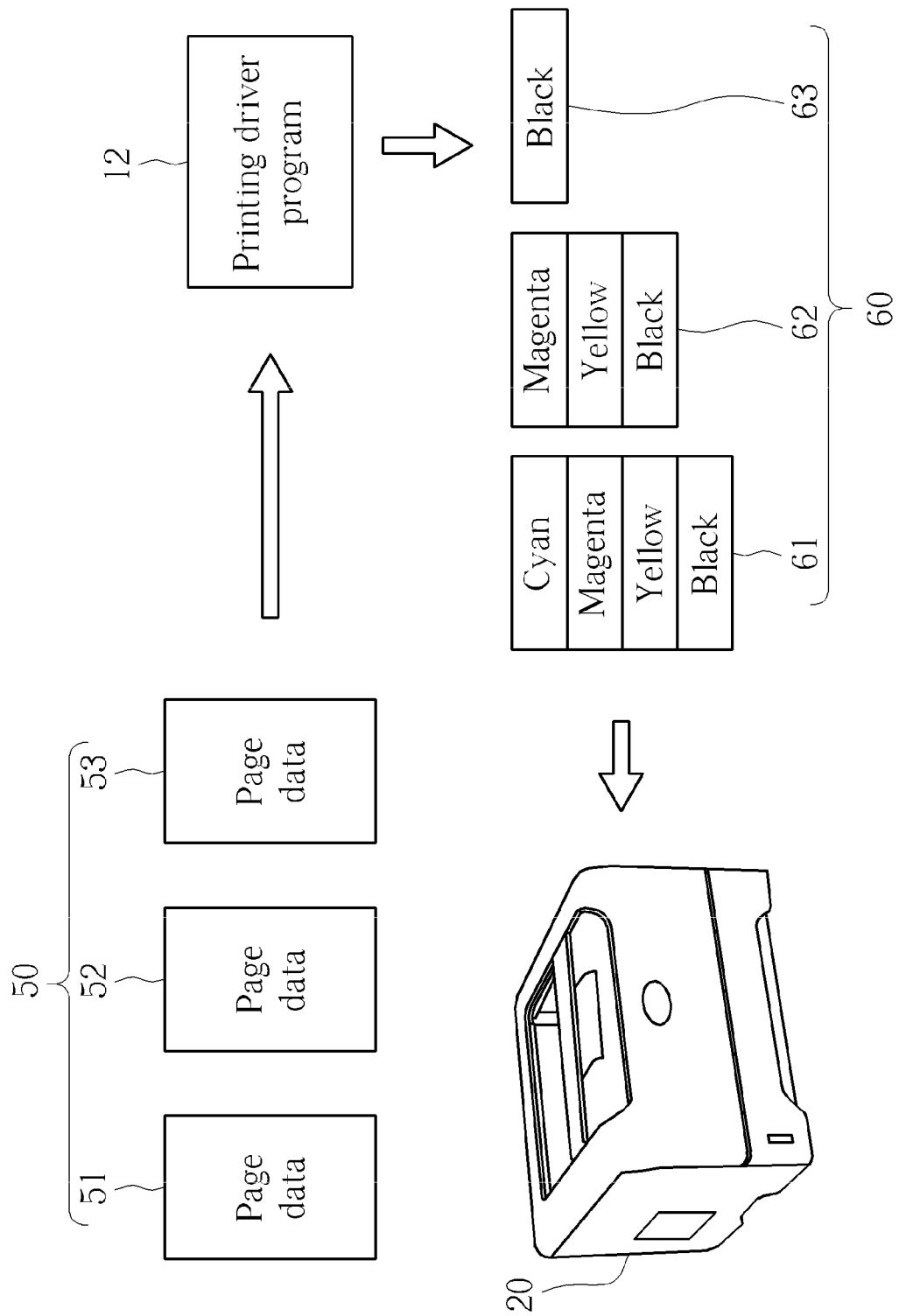
FIG. 3 is an illustration of a diagram of using the printing control method according to the invention for processing printing of many pages.

An exemplary case is illustrated in FIG. 3 to show how the printing control method 100 provided in the invention performs the printing process of a number of page data. When the application program 11 of the information providing device 10 generates a printing content 50 that includes page data 51~53, which may contain black and white text, two-tone or color text and/or images. In the embodiment in FIG. 3, the page data 51 contains hybrid content with full colored images and text, the page data 52 contains images and text with some single color, whereas the page data 53 contains only text in black. The printing content 50 generated by the application program 11 is sent to the printing driver program 12 and converted and compressed to a number of second color components.

After going through the checking step as described earlier, the printing content 50 is converted into a printing content 60, which includes page data 61~63. The page data 61 is a compressed result converted from the page data 51, the page data 62 is a compressed result converted from the page data 52, and the page data 63 is a compressed result converted from the page data 53. It can easily be noted that since the page data 51 contains full colored content, each of the four second color components may have concrete content after going through the conversion process, which means the page data 61 has all four second color components, the cyan, the magenta, the yellow, and the black. The page data 52 has fewer colors and therefore no cyan color component is produced during the conversion, which leaves only the magenta, the yellow, and the black second color components that have concrete content, i.e., the page data 62 has three second color components: the magenta, the yellow, and the black. For the page data 53, since it simply has text in black, only the second color component of black, for example, has concrete content after the conversion, which means the page data 63 may contain just the second color component of black.

All these page data 61~63, each having one or more second color components, form the printing content 60 and will be sent to the printer 20 together with their corresponding printing control codes. As a result, by implementing the printing control method provided by the invention, the printer 20 needs only rotate the photo conductor 23 for eight rounds, four rounds for printing the page data 61, three rounds for printing the page data 62, and one round for printing the page data 63, to finish the whole printing jog of the printing content 50. And during the printing process, the method just takes temporary space of eight second color components from the memory unit 21 of the printer 20 to finish the printing job, which also extensively reduces the requirement of the size of the memory unit 21 of the printer 20.

In conclusion, the printing control method of a printer provided by the invention is implemented in the printing system including the information providing device and the printer. The printer is connected to the information providing device for printing data sent by the information providing device. Once the printing driver program of the information providing device receives page data to be outputted, the printing driver program converts the first color components of the page data into the second color components and checks if any one of the second color components contains zeroes for all the content. If one second color component is found to have zeroes for all the content, this very second color component will not be sent to the printer, whereas the rest of the second color components will be sent to the printer for output. In such way, those second color components with no concrete content together with their corresponding printing control codes will be skipped for the transmission of printing content to the printer, which increases the printing rate and saves the memory requirement from the printer, especially when the printer is printing data with not so many colors.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A printing control method, wherein a printing system includes an information providing device and a printer, the printer electrically connected to the information providing device and adapted for printing data sent by the information providing device, the printing control method comprising following steps:

a printing driver program of the information providing device receiving page data from an application program of the information providing device, the page data comprising a plurality of first color components belonging to a first color space;

the printing driver program converting the plurality of first color components into a plurality of second color components belonging to a second color space;

the printing driver program checking if any of the second color components contains zeroes for all the content; and the printing driver program sending the plurality of second color components, except for a third color component, to the printer for outputting the page data, wherein the third color component is one of the plurality of the second color components that contains zeroes for all the content;

wherein the printer is a laser printer, an LED printer, or a multiple-imaging color ElectroPhotoGraphy (EPG) printer, and the printer sequentially prints the plurality of second color components using a photo conductor.

2. The printing control method of claim 1, further comprising following steps:

the printing driver program performing a compression process to each of the second color components respectively; and the printing driver program checking if any of the second color components contains zeroes for all the content during the compression process to each of the second color component.

3. The printing control method of claim 1, wherein the printing driver program sending the plurality of second color components to the printer comprising following steps:

the printing driver program sending the plurality of second color components, except for the third color component, and printing control code corresponding to each of the sent second color components to the printer; and the printer utilizing a memory unit to store the plurality of second color components, except for the third color component, and printing control code corresponding to each of the sent second color components sent by the information providing device.

4. A printing system, comprising:

an information providing device comprising a printing driver program and an application program, the printing driver program adapted for receiving page data from the application program, the page data comprising a plurality of first color components belonging to a first color space, the printing driver program adapted for converting the plurality of first color components into a plurality of second color components belonging to a second color space; and a printer electrically connected to the information providing device and adapted for printing data sent by the information providing device, the printing driver program adapted for sending the plurality of second color components, except for a third color component, to the printer for outputting the page data, wherein the third color component is one of the plurality of the second color components that contains zeroes for all the content.

5. The printing system of claim 4, wherein the printer is a laser printer or an LED printer and the printer is adapted for sequentially printing the plurality of second color components using a photo conductor.

6. The printing system of claim 4, wherein the printing driver program comprises a compression program adapted for performing a compression process to each of the second color components respectively, and the printing driver program is adapted for checking if any of the second color components contains zeroes for all the content during the compression process to each of the second color component.

7. The printing system of claim 4, wherein the printing driver program is adapted for sending the plurality of second color components, except for the third color component, and printing control code corresponding to each of the sent second color components to the printer, which comprising a memory unit to store the plurality of second color components, except for the third color component, and printing control code corresponding to each of the sent second color components sent by the information providing device.

8. The printing system of claim 4, wherein the first color space is a color space defined by three primary colors: red (R), green (G), and blue (B).

9. The printing system of claim 4, wherein the second color space is a color space defined by four primary colors of pigment: cyan (C), magenta (M), yellow (Y), and black (K).

10. The printing system of claim 4, wherein the printer is a multiple-imaging color ElectroPhotoGraphy (EPG) printer.

* * * * *